E. O. OSBORN & W. J. TUCKER.
HUMIDIFIER.
APPLICATION FILED FEB. 20, 1917.
1,238,322.
Patented Aug. 28, 1917.
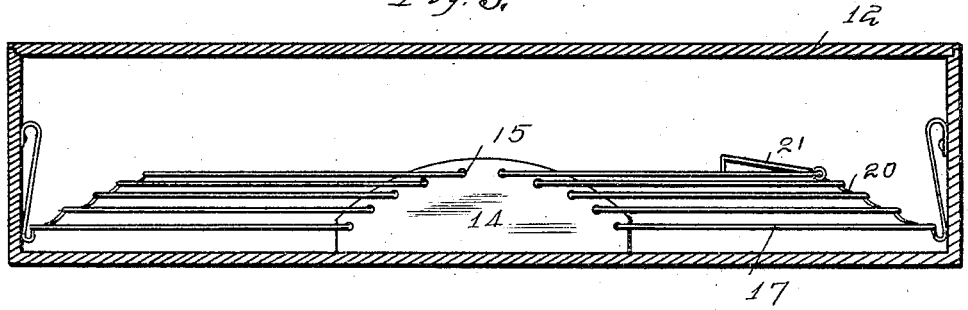
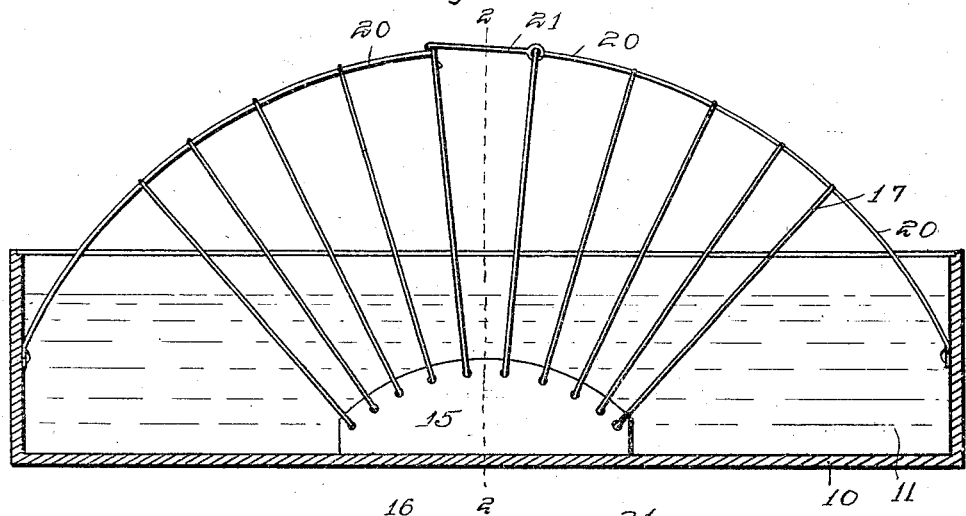
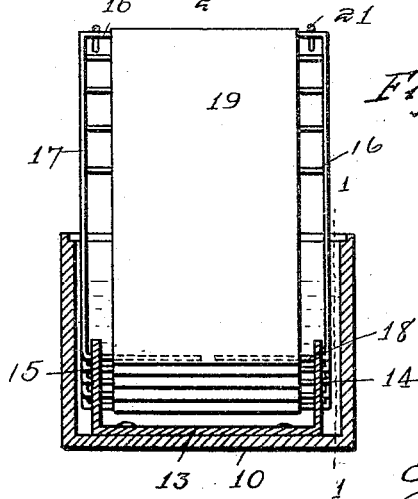

UNITED STATES PATENT OFFICE.

ERNEST O. OSBORN AND WALTER J. TUCKER, OF KNOXVILLE, IOWA.

HUMIDIFIER.

1,238,322.  Specification of Letters Patent.  Patented Aug. 28, 1917.

Application filed February 20, 1917. Serial No. 149,967.

*To all whom it may concern:*

Be it known that we, ERNEST O. OSBORN, and WALTER J. TUCKER, citizens of the United States, and residents of Knoxville, in the county of Marion and State of Iowa, have invented a certain new and useful Humidifier, of which the following is a specification.

The object of our invention is to provide a humidifier of very simple, durable and inexpensive construction.

A further object is to provide a humidifier comprising a water tight receptacle adapted to hold water or the like, and having a plurality of adjustable means adapted to be folded or moved to position received within the receptacle, or when desired moved to position extending upwardly from said receptacle, said means having absorbent material, whereby moisture may be drawn upwardly by capillary attraction from the receptacle, when said means are in their last position.

With these and other objects in view our invention consists in the construction, arrangement and combination of the various parts of the device whereby the objects contemplated are attained, as hereinafter more fully set forth, pointed out in our claims and illustrated in the accompanying drawings, in which:

Figure 1 shows a vertical, sectional view taken on the line 1—1 of Fig. 2.

Fig. 2 shows a central, transverse, sectional view taken on the line 2—2 of Fig. 1, and Fig. 3 shows a view similar to that shown in Fig. 1, with the movable members in their collapsed position.

Our invention may be made in a great variety of forms, and enough is shown in the drawings to illustrate one form in which the device may be embodied.

Our humidifier comprises a water proof receptacle 10, adapted to hold water 11 or other liquid, which receptacle may be provided with a cover 12 of any suitable form.

Mounted in the central lower part of the receptacle is a bracket having a plate 13, at the sides of which spaced from the side walls of the humidifier are upwardly extending wings or flanges, 14, the upper edges of which are preferably curved from their central portions downwardly toward each end, as clearly shown in Figs. 1 and 2. The wings 14 are provided with pairs of opposite openings 15.

Mounted on the wings 14 are a plurality of supporting members, which in the form of the invention shown in the drawings, each consist of a wire member having a central transverse portion 16, at each end of which is an arm 17 extending toward one of the wings 14.

At the inner or lower end of each arm 16 is an inwardly extending portion 18, rotatably received in one of the openings 15. It will be seen that the supporting member just described forms a bail pivotally mounted on the wings 14.

A plurality of said supporting members are provided, and they are of such length that when they are allowed to rest in their lowered position, they overlap and rest above each other in succession, as shown in Fig. 3.

The openings 15 in each wing are arranged substantially in the arc of a circle, as shown in the drawings, so that when the supporting members are in their collapsed or lowered positions, they rest one above the other as illustrated; all of the supporting members being thus permitted to lie in substantially horizontal position.

We preferably mount on the portions 16 and 18 strips of suitable absorbent material 19. Any suitable material may be employed.

Connected in some suitable way with the receptacle 10, as for instance, with the ends thereof, are flexible strips 20; each of the strips 20 being secured to the portions 16 of one-half of the supporting members. The two central supporting members may be fastened together in their upper position by the following means.

Pivoted to the member 16 of one of said central supporting members are hooks 21, adapted to engage the member 16 of the adjacent supporting member, as illustrated in Fig. 1.

When the device is not in use, the supporting members with the absorbent material thereon may be left in their lowered positions, as shown in Fig. 3.

When it is desired to use the humidifier in cigar cases or the like, the cover is removed and the supporting members are raised to the position shown in Fig. 1; the hook members being moved to operative position relative to the supporting members will all be held in their upwardly extending positions.

By means of the hook members and by the flexible devices 20, the liquid 11 will travel by capillary attraction up the material 19 and the members 20 so as to afford extensive evaporation to the device during its use.

When not in use the cover may be placed in position after the supporting members have been lowered and the device can be carried or stored in convenient form.

We are able to embody our invention in a great variety of parts, and almost all the parts may be made in a great variety of forms and constructions, and it is our intention to cover by the claims of the patent to be issued on our application any modified forms of structure or use of mechanical equivalents, which may be included within the scope of our claims.

We claim as our invention:—

1. A humidifier comprising a receptacle, a plurality of supporting members having absorbent material, said members being pivoted at their lower ends, and adapted in one position to rest entirely within the receptacle, and means for supporting said supporting members in their upright position projecting with said absorbent material out of the receptacle.

2. A humidifier comprising a receptacle, a plurality of strips of absorbent material, means for supporting said strips, said means being adapted to move from substantially horizontal position in the lower part of the receptacle to upwardly extending position, and releasable means for supporting said last means in their last described position.

3. A humidifier comprising a receptacle, a bracket in the lower part of said receptacle, upwardly extending members, a plurality of supporting devices pivoted on said upwardly extending members, the pivot points of said supporting devices being arranged in the arc of a circle for permitting said supporting devices to rest superposed in horizontal position in the lower part of the receptacle, absorbent material on said supporting devices, and releasable means for holding said supporting devices in raised position partially projecting from said receptacle.

4. In a humidifier, a receptacle, a bracket in the bottom thereof having upwardly extending side wings, said side wings being provided with opposite pairs of openings, the openings of each side wing being arranged substantially in the arc of a circle, a plurality of supporting devices having members pivotally mounted in said openings, whereby said members may be arranged in two series, the members of each series being superposed in horizontal position within the receptacle, absorbent material on said supporting devices, and means for holding said supporting devices in their raised position, partially projecting from the receptacle.

Des Moines, Iowa, February 10, 1917.
ERNEST O. OSBORN.
WALTER J. TUCKER.

Copies of this patent may be obtained for five cents each, by addressing the "Commissioner of Patents, Washington, D. C."